(12) United States Patent
Mukouyama (10) Patent No.: US 10,461,995 B2
(45) Date of Patent: Oct. 29, 2019

(54) WIRELESS TRANSMISSION DEVICE, FAULT NOTIFICATION METHOD, AND PROGRAM

(71) Applicant: NEC CORPORATION, Tokyo (JP)

(72) Inventor: Motohiro Mukouyama, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/743,371

(22) PCT Filed: Jul. 11, 2016

(86) PCT No.: PCT/JP2016/070381
§ 371 (c)(1),
(2) Date: Jan. 10, 2018

(87) PCT Pub. No.: WO2017/010443
PCT Pub. Date: Jan. 19, 2017

(65) Prior Publication Data
US 2018/0212820 A1 Jul. 26, 2018

(30) Foreign Application Priority Data
Jul. 14, 2015 (JP) .................... 2015-140211

(51) Int. Cl.
*H04L 12/24* (2006.01)
*H04W 76/30* (2018.01)
*H04W 24/04* (2009.01)
*H04L 29/14* (2006.01)

(52) U.S. Cl.
CPC ...... *H04L 41/0686* (2013.01); *H04L 41/0659* (2013.01); *H04L 41/18* (2013.01); *H04L 69/40* (2013.01); *H04W 24/04* (2013.01); *H04W 76/30* (2018.02)

(58) Field of Classification Search
None
See application file for complete search history.

(56) References Cited

U.S. PATENT DOCUMENTS 8,737,198 B1 * 5/2014 Holness ............... H04L 12/437
370/222
2007/0189154 A1 * 8/2007 Hourtane ............. H04L 12/42
370/218

(Continued)

FOREIGN PATENT DOCUMENTS

JP   2003-018159 A   1/2003
JP    3623396 B2    2/2005

(Continued)

OTHER PUBLICATIONS

International Search Report of PCT/JP2016/070381 dated Aug. 30, 2016.

*Primary Examiner* — Jamaal Henson
(74) *Attorney, Agent, or Firm* — Sughrue Mion, PLLC (57) ABSTRACT

A wireless transmission device is configured to group together as a first link group transmission lines connected to the wireless transmission device and a transmission lines connected to adjacent devices that are wireless transmission devices adjacent to the wireless transmission device and to share status information of transmission lines of the first link group with the adjacent devices.

4 Claims, 9 Drawing Sheets

(56) References Cited

U.S. PATENT DOCUMENTS

| | | | |
|---|---|---|---|
| 2011/0038267 A1* | 2/2011 | Smith | H04L 43/0811 370/248 |
| 2012/0155254 A1 | 6/2012 | Hinosugi | |
| 2014/0226461 A1 | 8/2014 | Hashimoto et al. | |
| 2014/0369186 A1 | 12/2014 | Ernstrom et al. | |

FOREIGN PATENT DOCUMENTS

| | | |
|---|---|---|
| JP | 2005-217565 A | 8/2005 |
| JP | 2006-067239 A | 3/2006 |
| JP | 2012-065422 A | 3/2012 |
| JP | 2012-129759 A | 7/2012 |
| JP | 2014-155186 A | 8/2014 |
| WO | 2012/056711 A1 | 5/2012 |
| WO | 2012/153528 A1 | 11/2012 |
| WO | 2012/160826 A1 | 11/2012 |
| WO | 2013/069629 A1 | 5/2013 |
| WO | 2014/125761 A1 | 8/2014 |

\* cited by examiner

WIRELESS TRANSMISSION DEVICE, FAULT NOTIFICATION METHOD, AND PROGRAM

CROSS REFERENCE TO RELATED APPLICATIONS

This application is a National Stage of International Application No. PCT/JP2016/070381 filed Jul. 11, 2016, claiming priority based on Japanese Patent Application No. 2015-140211 filed Jul. 14, 2015, the contents of all of which are incorporated herein by reference in their entirety.

TECHNICAL FIELD

The present invention relates to a wireless transmission device that notifies another device of a fault that has occurred on a transmission line, a fault notification method, and a program for causing a computer to execute the fault notification method.

BACKGROUND ART

In recent years, the shift to IP (Internet Protocol) of networks has progressed, and with this progression, the opportunities for wireless transmission devices to accommodate packet system signals has increased. In addition, the realization of large-capacity transmission has resulted in an increase in networks that are made up of wireless transmission devices that are connected to a plurality of wired transmission lines and a plurality of wireless transmission lines.

For example, Patent Document 1 discloses a fault notification method in a network that is made up by wireless transmission devices that are connected to a plurality of wired transmission lines and a plurality of wireless transmission lines.

In the fault notification method disclosed in Patent Document 1, a wireless transmission device, upon detecting a fault that has occurred on a wireless transmission line that is connected to the wireless transmission device, reports fault information, that indicates the occurrence of the fault, to transfer-destination wireless transmission devices of user data by way of the wireless transmission device.

In the technique disclosed in Patent Document 1 as described hereinabove, the fault information that was detected by a wireless transmission device is reported to other wireless transmission devices that are directly connected to the wireless transmission device by way of a wireless transmission line. However, the problem arises that the fault information is not reported to other wireless devices that are connected via a plurality of wireless transmission devices.

RELATED ART DOCUMENTS

Patent Documents

Patent Document 1: WO2013/069629 A1

SUMMARY

It is therefore an object of the present invention to provide a wireless transmission device, a fault notification method, and a program that enable reporting information of a fault that has occurred on a transmission line to devices that are not directly connected to the transmission line.

An exemplary aspect of the wireless transmission device of the present invention for achieving the above-described object is of a configuration that groups as a first link group transmission lines that are connected to the wireless transmission device and transmission lines that are connected to adjacent devices that are wireless transmission devices that are adjacent to the wireless transmission device and then shares status information of transmission lines of the first link group with the adjacent devices.

In addition, an exemplary aspect of the fault notification method of the present invention is a fault notification method realized by a wireless transmission device, and includes steps of: grouping, as a first link group, transmission lines that are connected to the wireless transmission device and transmission lines that are connected to adjacent devices that are wireless transmission devices adjacent to the wireless transmission device; and sharing status information of the transmission lines of the first link group with the adjacent devices.

Still further, an exemplary aspect of the program of the present invention is a program for causing a computer to execute procedures of:

grouping, as a first link group, transmission lines that are connected to the computer and transmission lines that are connected to adjacent devices that are wireless transmission devices that are adjacent to the computer; and sharing status information of the transmission lines of the first link group with the adjacent devices.

EXAMPLE EMBODIMENT

The configuration of the communication system of the present invention is first described using the drawings.

Figure 1:
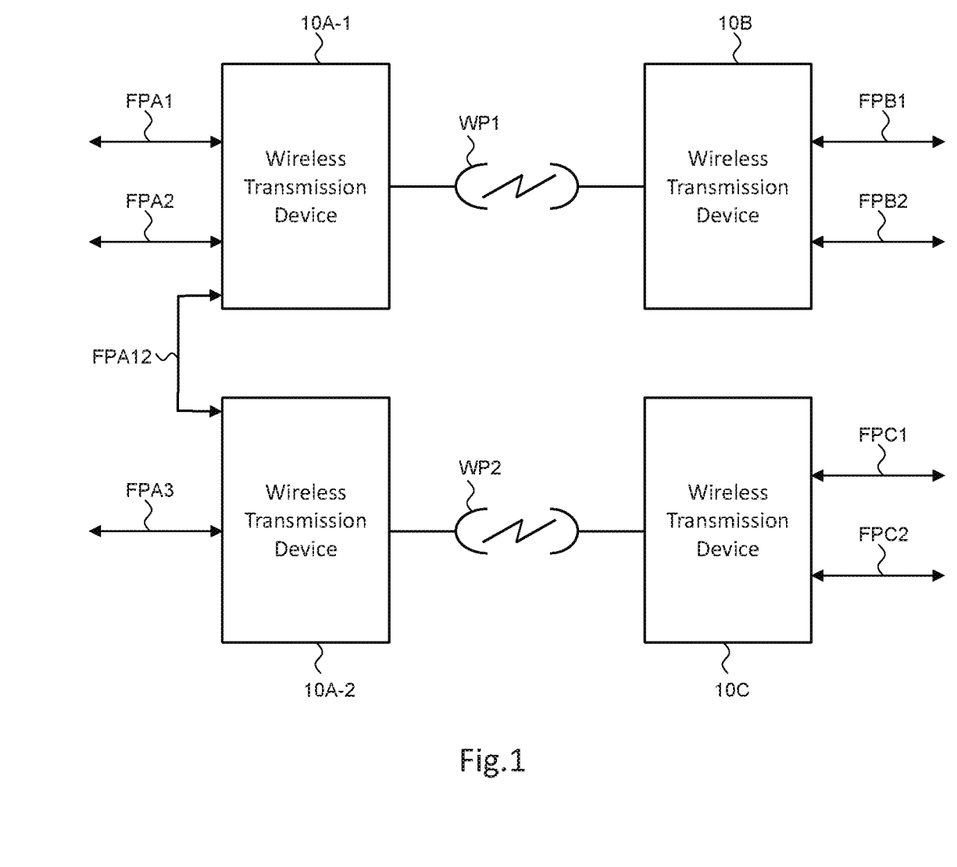
FIG. 1 is a block diagram showing an example of the configuration of the communication system of the present invention.

FIG. 1 is a block diagram showing an example of the configuration of the communication system of the present invention.

The communication system shown in FIG. 1 has wireless transmission devices 10A-1, 10A-2, 10B, and 10C.

Wireless transmission device 10A-1 is connected to wireless transmission device 10A-2 by way of wired transmission line FPA12. In other words, wireless transmission device 10A-1 and wireless transmission device 10A-2 are adjacent by way of wired transmission line FPA12. In the following explanation, one device of these adjacent wireless transmission devices will be referred to as an "adjacent device" of the other. The inter-device connection interface that includes wired transmission line FPA12 is used for transmitting and receiving information that is to be shared between adjacent devices apart from LAN (Local Area Network) signals that are transmitted and received by way of user circuits.

"User circuits" refers to transmission lines for sending user data that are data that users are to transmit and receive using the communication system of the present example embodiment. In addition, LAN signals are, for example, interface signals as standardized by IEEE 802.3.

Wireless transmission device 10A-1 is connected to wireless transmission device 10B by way of wireless transmission line WP1. In other words, wireless transmission device 10A-1 and wireless transmission device 10B are opposite to each other by way of wireless transmission line WP1. In the following explanation, one of these opposite wireless transmission devices will be referred to as the "opposite device" of the other.

Wireless transmission device 10A-2 is connected to wireless transmission device 10C by way of wireless transmission line WP2. Wireless transmission device 10A-2 and wireless transmission device 10C are devices that are opposite to each other.

Wireless transmission device 10A-1 is connected to wireless transmission line WP1 as well as to wired transmission lines FPA1, FPA2, and FPA12. Wireless transmission device 10A-2 is connected to wireless transmission line WP2 as well as to wired transmission lines FPA3 and FPA12.

Wireless transmission device 10B is connected to wireless transmission line WP1 as well as to wired transmission lines FPB1 and FPB2. Wireless transmission device 10C is connected to wireless transmission line WP2 as well as to wired transmission lines FPC1 and FPC2.

The wired transmission lines and wireless transmission lines shown in FIG. 1 are a portion of the network by which user data are transmitted by way of the communication system of the present example embodiment.

The configuration of wireless transmission devices 10A-1, 10A-2, 10B and 10C shown in FIG. 1 is next described using the accompanying drawing. Because wireless transmission devices 10A-1, 10A-2, 10B, and 10C are of the same configuration, only the configuration of wireless transmission device 10A-1 will be described here.

Figure 2:
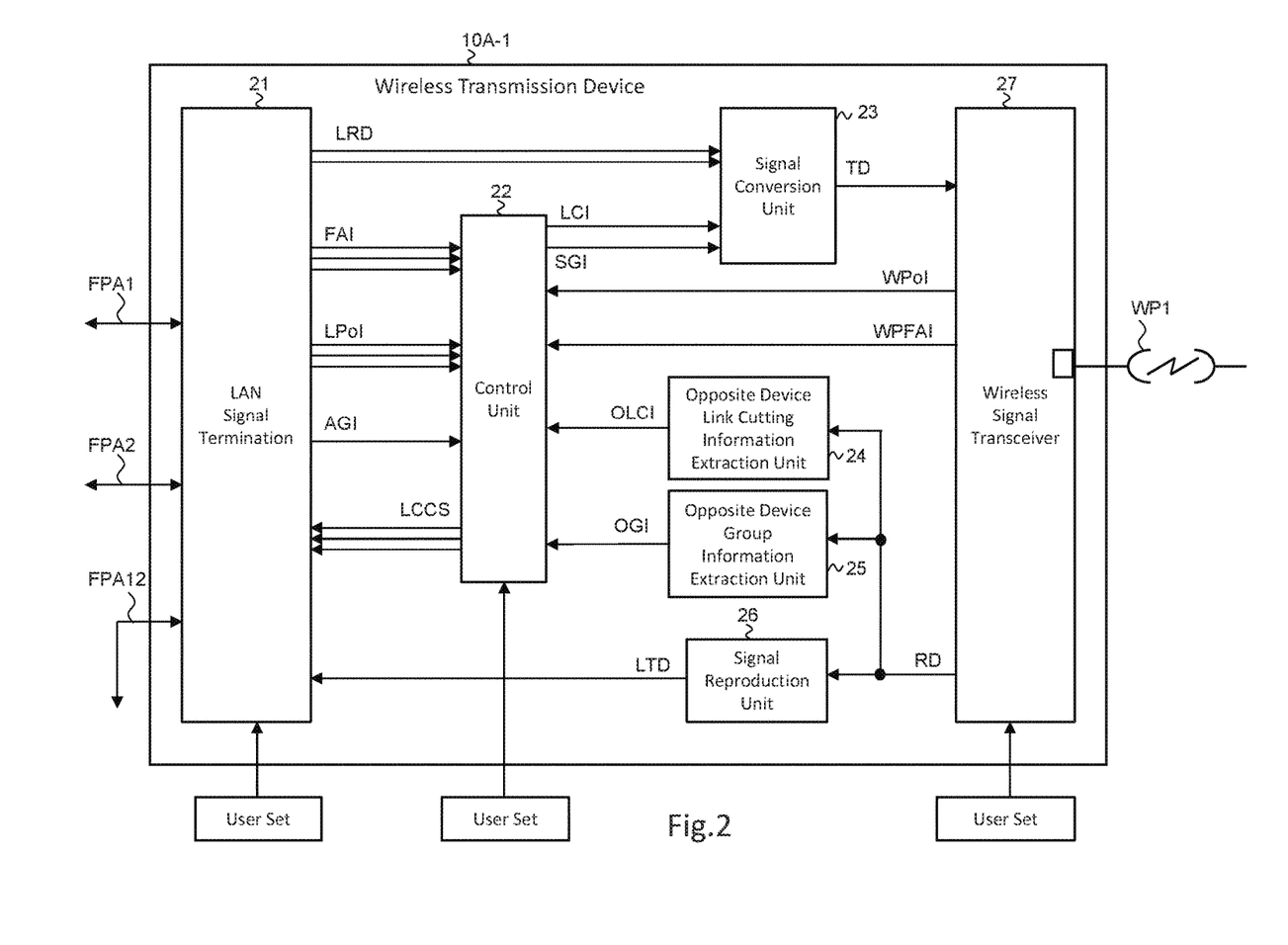
FIG. 2 is a block diagram showing an example of the configuration of the wireless transmission device of the present invention.

FIG. 2 is a block diagram showing an example of the configuration of the wireless transmission device of the present invention.

As shown in FIG. 2, wireless transmission device 10A-1 has: LAN signal termination 21, control unit 22, signal conversion unit 23, opposite device link cutting information extraction unit 24, opposite device group information extraction unit 25, signal reproduction unit 26, and wireless signal transceiver 27. In FIG. 2, the ability of the manager (user) of wireless transmission device 10A-1 to set link groups is represented as "user set".

LAN signal termination 21 establishes a link in the data link layer with a network apparatus (not shown in the figure) by way of wired transmission line FPA 1 or FPA2. LAN signal termination 21, upon receiving LAN reception data LRD that is an LAN signal from a network apparatus or wireless transmission device 10A-2 by way of wired transmission line FPA1, FPA2, or FPA12, supplies the LAN reception data LRD to signal conversion unit 23.

In addition, LAN signal termination 21 transmits LAN transmission data LTD that is a LAN signal received from signal reproduction unit 26 to a network apparatus (not shown) by way of wired transmission line FPA1 or FPA2 or to wireless transmission device 10A-2 by way of wired transmission line FPA12.

LAN signal termination 21 also holds LAN port information LPoI that is information placed in association with a LAN port and wired status information that indicates the status "used" or "unused" regarding each of wired transmission lines FPA1, FPA2, and FPA12 and reports the LAN port information LPoI to control unit 22.

LAN signal termination 21 further monitors wired transmission lines FPA1, FPA2, and FPA12, and upon the occurrence of a fault on any of these transmission lines, reports fault information FAI that includes information indicating that a fault has occurred and the LAN port that corresponds to the transmission line on which the fault occurred.

Signal conversion unit 23 multiplexes LAN reception data LRD that was received from LAN signal termination 21, link cutting information LCI and own-device group information SGI of wireless transmission device 10A-1 that were received from control unit 22 to generate transmission data TD, and supplies this transmission data TD to wireless signal transceiver 27.

Own-device group information SGI is information indicating the correspondence relation between "used" status wired transmission lines and wireless transmission lines that are connected to wireless transmission device 10A-1 and link groups to which the wired transmission lines and wireless transmission lines belong. One link group is made up by a combination of "used" status wired transmission lines and wireless transmission lines that are connected to wireless transmission device 10A-1. Basically, one wired transmission line belongs to one link group. On the other hand, one wireless transmission line may belong to a plurality of link groups. This own-device group information SGI can be freely set by a manager.

Link cutting information LCI includes information that indicates that the communication connection of any transmission line among wired transmission lines FPA1, FPA2, and FPA12 as well as wireless transmission line WP1 has been cut (link cutting) and information of the ports that correspond to this transmission line. Examples of the cause of link cutting include link cutting based on fault information FAI received from an adjacent device or an opposite device.

Wireless signal transceiver 27 transmits transmission data TD that was received from signal conversion unit 23 to wireless transmission device 10B by way of wireless transmission line WP1. In addition, wireless signal transceiver 27 supplies reception data RD that was received from wireless transmission device 10B by way of wireless transmission line WP1 to signal reproduction unit 26.

Wireless signal transceiver 27 also holds wireless port information WPoI, which is information that places in association wireless ports and wireless status information that indicates whether wireless transmission line WP1 is "used" or "unused," and reports this wireless port information WPoI to control unit 22.

Wireless signal transceiver 27 monitors wireless transmission line WP1 and, upon the occurrence of a fault on this wireless transmission line WP1, reports to control unit 22 fault information FAI that includes information indicating that a fault has occurred and information of the wireless port where the fault occurred.

Upon receiving reception data RD from wireless signal transceiver 27, signal reproduction unit 26 reproduces the user data from reception data RD, generates LAN transmission data LTD that is a LAN signal that contains the reproduced user data, and supplies the generated LAN transmission data LTD to LAN signal termination 21.

When opposite device link cutting information OLCI is contained in reception data RD, opposite device link cutting information extraction unit 24 extracts the opposite device link cutting information OLCI from the reception data RD and notifies control unit 22. Opposite device link cutting information OLCI is equivalent to link cutting information in wireless transmission device 10B that is the opposite device of wireless transmission device 10A-1.

When opposite device group information OGI is contained in reception data RD, opposite device group information extraction unit 25 extracts opposite device group information OGI from reception data RD and notifies control unit 22. Opposite device group information OGI is equivalent to own-device group information in wireless transmission device 10B that is the opposite device of wireless transmission device 10A-1.

Control unit 22 holds each of LAN port information LPoI that was received from LAN signal termination 21, wireless port information WPoI that was received from wireless signal transceiver 27, adjacent device group information AGI that was received from wireless transmission device 10A-2, and opposite device group information OGI that was received from opposite device group information extraction unit 25. Adjacent device group information AGI is own-device group information in wireless transmission device 10A-2 that is the adjacent device of wireless transmission device 10A-1.

Control unit 22 supplies own-device group information SGI to signal conversion unit 23. Control unit 22, upon receiving fault information FAI from LAN signal termination 21, supplies link cutting information LCI to signal conversion unit 23. In addition, upon receiving opposite device link cutting information OLCI from opposite device link cutting information extraction unit 24, control unit 22 supplies to LAN signal termination 21 link cutting control signal LCCS that contains information instructing link cutting and information indicating the transmission line that is the object of the link cutting.

Figure 3:
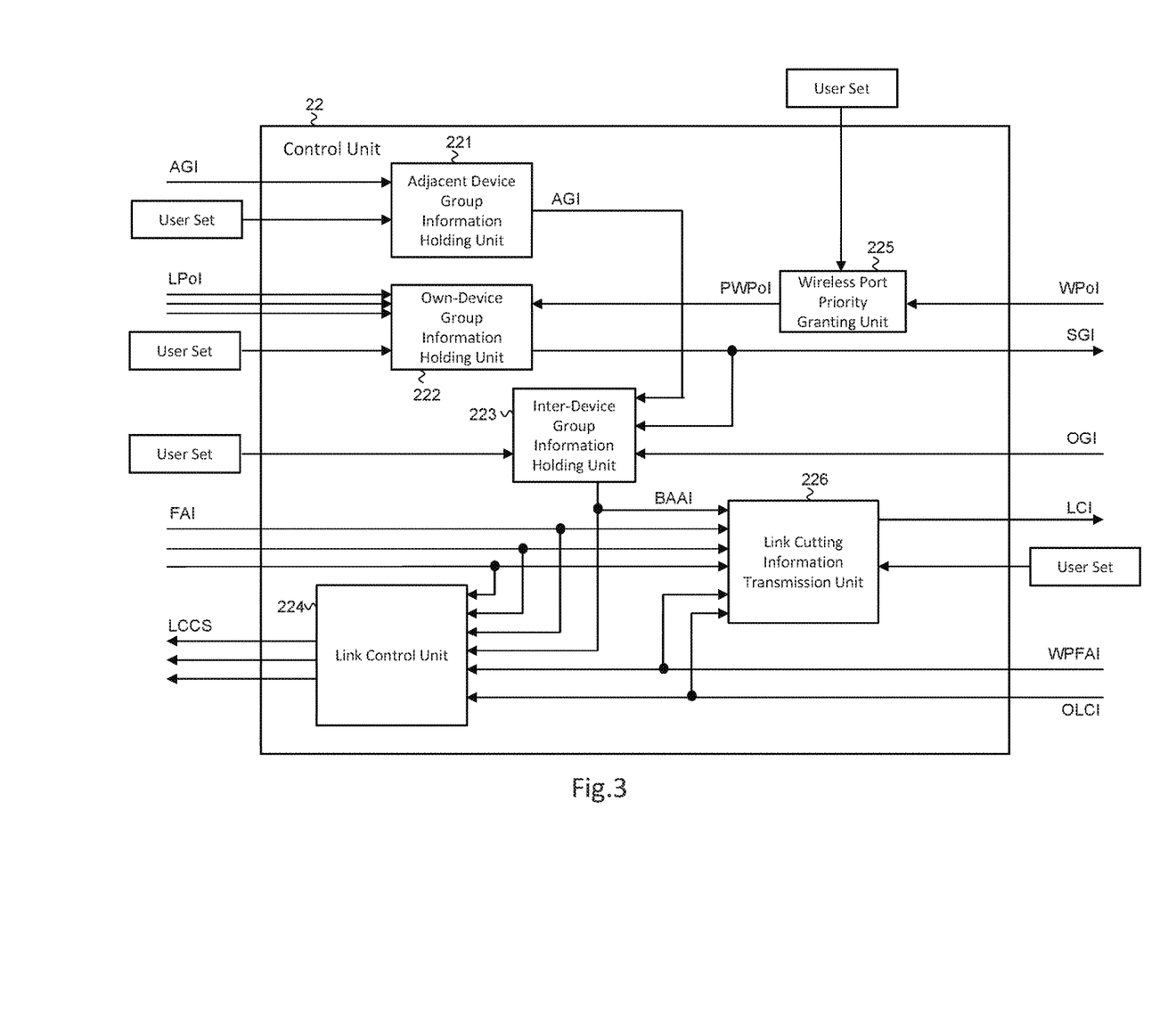
FIG. 3 is a block diagram showing an example of the configuration of the control unit shown in FIG. 2.

The configuration of control unit 22 is next described using the accompanying drawing. FIG. 3 is a block diagram showing an example of the configuration of the control unit shown in FIG. 2. In FIG. 3, as in FIG. 2, the ability of the manager of wireless transmission device 10A-1 to set, for example, the link groups (to be described), the order of priority of transmission lines, the notification destinations of fault information, and the associations among link groups, is represented as "user set".

As shown in FIG. 3, control unit 22 has: adjacent device group information holding unit 221, own-device group information holding unit 222, inter-device group information holding unit 223, link control unit 224, wireless port priority granting unit 225, and link cutting information transmission unit 226.

Adjacent device group holding unit 221 holds adjacent device group information AGI that was received from wireless transmission device 10A-2 and supplies the adjacent device group information AGI to inter-device group information holding unit 223.

When the priority of a wireless port is set by a manager, wireless port priority granting unit 225 supplies to own-device group information holding unit 222 prioritized wireless port information PWPoI that indicates wireless ports for which priority has been set. When priority has not been set by the manager, wireless port priority granting unit 225 supplies wireless port information WPoI to own-device group information holding unit 222.

Own-device group information holding unit 222 holds LAN port information LoI and prioritized wireless port information PWoI, and transmits own-device group information SGI to inter-device group information holding unit 223 and wireless transmission device 10B that is the opposite device.

Inter-device group information holding unit 223 generates inter-device group information BAAI that contains adjacent device group information AGI, own-device group information SGI, and opposite device group information OGI and notifies link control unit 224 and link cutting information transmission unit 226.

The manager can set link groups to inter-device group information holding unit 223 in order that a wired transmission line or wireless transmission line that is connected to wireless transmission device 10A-1 and a wired transmission line or wireless transmission line that is connected to wireless transmission device 10A-2 are in the same link group. This type of inter-adjacent device link group that is the link group that is set to straddle adjacent devices may be included in own-device group information SGI or adjacent device group information AGI of wireless transmission device 10A-1. An inter-adjacent device link group can be set by a manager to any of adjacent device group information holding unit 221, own-device group information holding unit 222, and inter-device group information holding unit 223.

Inter-device group information holding unit 223 holds inter-adjacent device link groups and link groups that are contained in opposite device group information OGI in association. This association process can also be set by a manager.

Link control unit 224 determines whether to cut a communication connection that uses wired transmission lines FPA1, FPA2, and FPA12 on the basis of fault information that is received by way of wired transmission line FPA1, FPA2, or FPA12, opposite device link cutting information OLCI and wireless interval fault information WPFAI that are received from wireless transmission device 10B, and inter-device group information BAAI, and supplies link cutting control signal LCCS for instructing link cutting of a transmission line that is the object of cutting.

For example, link control unit 224, upon receiving from wireless transmission device 10B link cutting information or fault information relating to a transmission line that belongs to a link group contained in opposite device group information, transmits to LAN signal termination 21 link cutting control signal LCCS for cutting the communication connection of the wired transmission line that belongs to the inter-adjacent device link group that is associated with the link group, and moreover, that is connected to wireless transmission device 10A-1.

Upon receiving any of fault information that relates to wired transmission lines FPA1, FPA2, and FPA12, wireless interval fault information WPFAI that relates to wireless transmission line WP1, and opposite device link cutting information OLCI that relates to the link group of an opposite device, link cutting information transmission unit 226 refers to inter-device group information BAAI and determines whether to cut the communication connection of the wired transmission line or wireless transmission line. When there is a transmission line that is to be the object of cutting, link cutting information transmission unit 226 further transmits link cutting information LCI for that transmission line to wireless transmission device 10A-2 and 10B. For example, when a fault occurs in a transmission line that belongs to the above-described inter-adjacent device link group, link cutting information transmission unit 226 transmits the fault information to wireless transmission device 10B that is the opposite device, and upon receiving from wireless transmission device 10B information of the fault that occurred in the transmission line of the link group that is contained in the opposite device group information, transfers the fault information to wireless transmission device 10A-2. The notification destination of the fault information can be set by the manager.

Shared information that wireless transmission device 10A-1 shares with wireless transmission device 10A-2 is here described. "Own device" that is used in the following explanation of each item of shared information refers to wireless transmission device 10A-1.

Own-device link group information: Information of the link groups that are set to its own device.

Own-device wireless transmission line priority information: Information of the priority that is set to wireless transmission lines by a manager. When the manager sets priority to wireless ports of wireless transmission devices 10A-1 and 10A-2, the priority information is shared among adjacent devices. This information may be contained in the inter-adjacent device link group.

Port information belonging to each link group: Wired status information that indicates the "used" or "unused" status of an LAN port and wireless status information that indicates the "used" or "unused" status of a wireless port.

Fault information received from an opposite device (wireless transmission device 10B): Information that indicates a fault that has occurred in a transmission line that is connected to wireless transmission device 10B.

Link cutting information of an opposite device (wireless transmission device 10B): Information relating to link cutting executed by wireless transmission device 10B.

Link group information of an opposite device (wireless transmission device 10B): Information of a link group that was set in an opposite device.

Own-device link cutting control information: Information of a port for which the own-device executed link cutting.

Fault condition of the wired transmission line of own-device: Information that indicates whether the communication connection of a wired transmission line that is connected to own-device is normal or has been cut.

Fault condition of wireless transmission line of own-device: Information that indicates whether the communication connection of a wireless transmission line connected to own-device is normal or has been cut.

As described hereinabove, in a wireless transmission device of the present invention, link group information of adjacent devices is received as shared information among adjacent devices (information relevant to adjacent devices is all received as adjacent device group information AGI), and the wired transmission lines and wireless transmission lines by which connection is made to adjacent devices are caused to belong to any link group by means of the manager's settings.

A link group that has been set between wireless transmission device 10A-1 and an adjacent device (among adjacent devices) is the same as a link group when wireless transmission device 10A-1 and the adjacent devices are seen as one device. As a result, as indicated by the above-described shared information, in addition to the link group information of adjacent devices link cutting information and fault information received from an opposite device must be shared among adjacent devices.

Although an example is described in which the above-described shared information was provided by wireless transmission device 10A-1, wireless transmission device 10A-1 also shares with wireless transmission device 10A-2 the link group information of wireless transmission device 10C that is the opposite device of an adjacent device In addition, the functions of control unit 22 in the function block diagram shown in FIG. 3 may be realized by a dedicated integrated circuit such as an ASIC (Application Specific Integrated Circuit) or may be realized by a processing device that includes a CPU (Central Processing Unit) and memory. The memory is, for example, flash memory. More specifically, control unit 22 has a memory that holds a program and a CPU that executes processing in accordance with the program and realizes the functions of control unit 22 shown in FIG. 3 by the CPU that executes processing in accordance with the program.

The fault notification method of the present invention is next described using the accompanying drawings. Examples of the application of the present invention are described below. In the drawings for describing each example of application, the site of occurrence of a fault is indicated by a star symbol.

First Application Example

Figure 4:
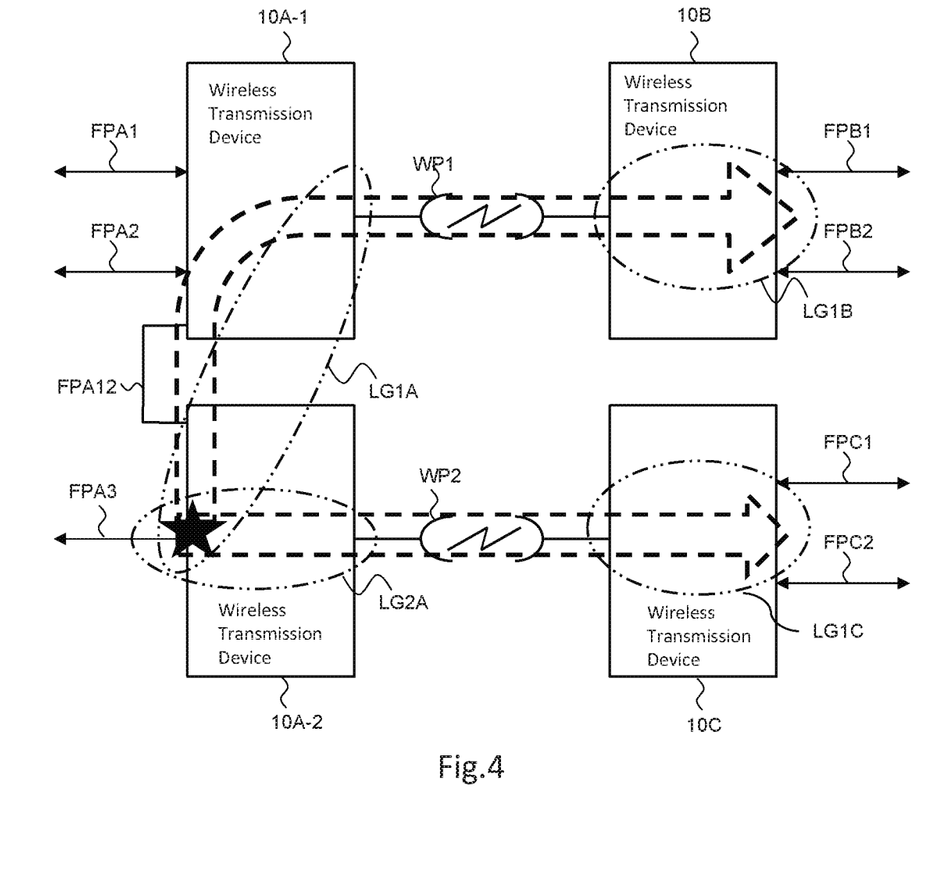
FIG. 4 is a view for describing the operation in a first example of application of the present invention.

The first application example is a case in which wireless transmission line WP1 that is connected to wireless transmission device 10A-1 and wired transmission line FPA3 that is connected to wireless transmission device 10A-2 that is adjacent to wireless transmission device 10A-1 belong to the same link group.

Figure 5:
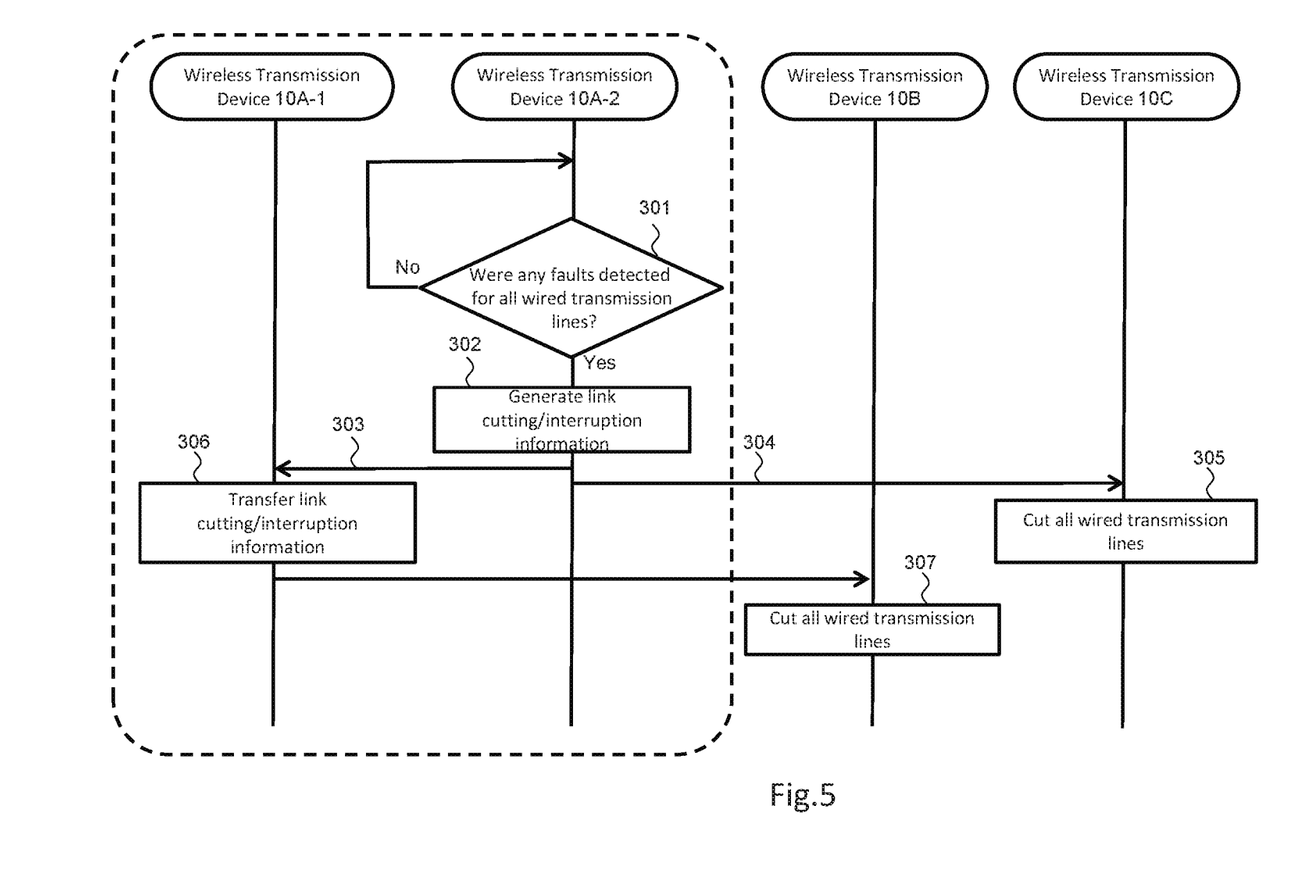
FIG. 5 is a sequence chart showing the operation procedure in the first example of the application of the present invention.

FIG. 4 is a view for describing the operation in the first application example of the present invention. FIG. 5 is a sequence diagram showing the operation procedure in the first application example of the present invention.

In the first application example, as shown in FIG. 4, wired transmission line FPA3 and wireless transmission line WP1 belong to link group LG1A, and wired transmission line FPA3 and wireless transmission line WP2 belong to link group LG2A. In addition, wireless transmission line WP1, wired transmission line FPB1, and wired transmission line FPB2 belong to link group LG1B, and wireless transmission line WP2, wired transmission line FPC1, and wired transmission line FPC2 belong to link group LG1C. Link group LG1A and link group LG1B are placed in association with each other.

In this state, a case is considered in which a fault occurs on, for example, wired transmission line FPA3.

In this case, upon detecting the fault that has occurred on wired transmission line FPA3 (Step 301), wireless transmission device 10A-2 generates link cutting information (Step 302), and transmits the link cutting information to wireless transmission device 10A-1 and wireless transmission device 10C (Steps 303 and 304).

Upon receiving the link cutting information from wireless transmission device 10A-2, wireless transmission device 10A-1 transfers the link cutting information to wireless transmission device 10B that is opposite to wireless transmission device 10A-1 (Step 306). Wireless transmission device 10B, having received the link cutting information from wireless transmission device 10A-1, executes cutting of the communication connections of wired transmission lines FPB1 and FPB2 that belong to link group LG1B that corresponds to link group LG1A (Step 307).

On the other hand, wireless transmission device 10C, having received the link cutting information from wireless transmission device 10A-2, executes cutting of the communication connections of wired transmission lines FPC1 and FPC2 that belong to link group LG1C (Step 305).

In the present invention, adjacent wireless transmission devices 10A-1 and 10A-2 together share their partners' own-device group information. As a result, regardless of the group information to which link group LG1A belongs, the information of this link group LG1A is shared by adjacent wireless transmission devices 10A-1 and 10A-2. The flow of fault notification is schematically shown by broken-line arrows in FIG. 4. As shown in FIG. 4, the information of a fault that has occurred in wired transmission line FPA3 of wireless transmission device 10A-2 is notified to wireless transmission device 10A-1, and the link cutting that originates from the occurrence of this fault is executed in wireless transmission device 10B. In the sequence diagram shown in FIG. 5, Step 303 and Steps 306-307 are the characteristic operations of the first application example. Steps 304-305 are equivalent to the link cutting control according to the technique disclosed in Patent Document 1 that was described in the background art.

Second Application Example

Figure 6:
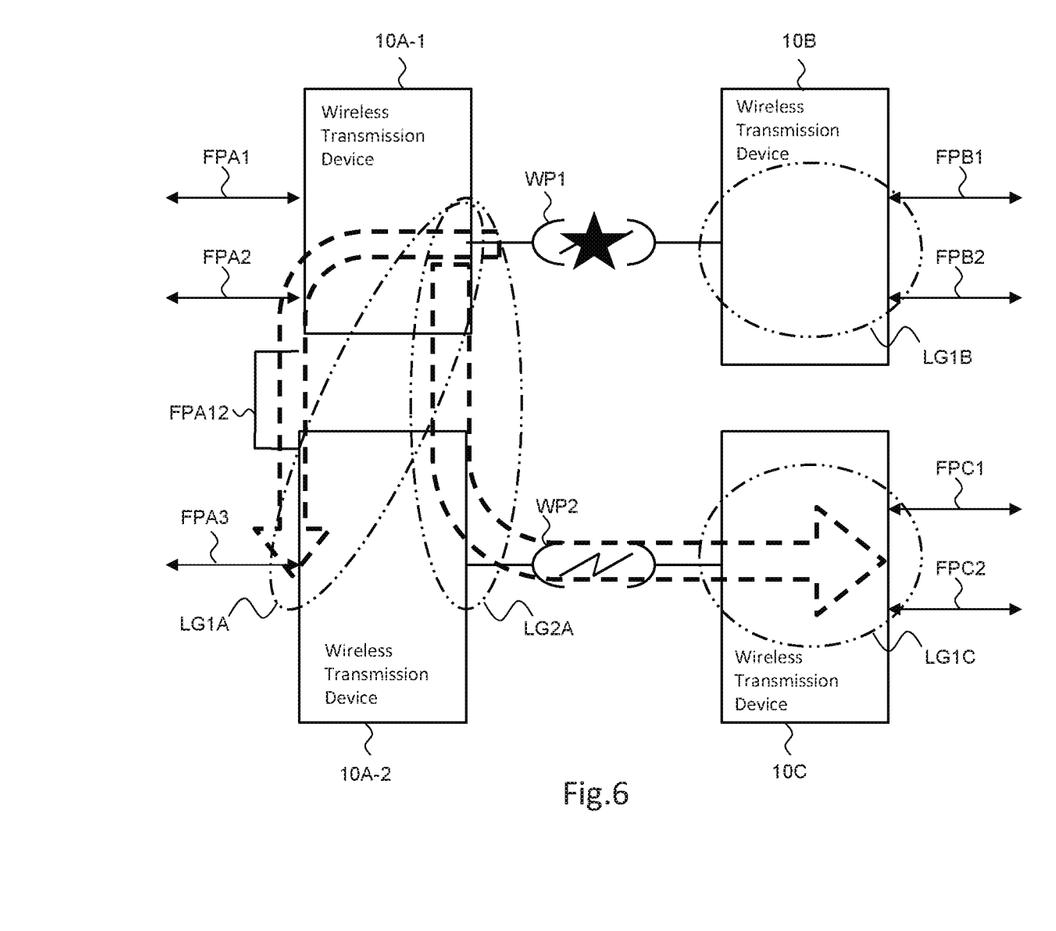
FIG. 6 is a view for describing the operation in a second example of application of the present invention.

The second application example is an example in which wireless transmission line WP1 that is connected to wireless transmission device 10A-1 and wired transmission line FPA3 that is connected to wireless transmission device 10A-2 belong to the same link group, and wireless transmission line WP1 that is connected to wireless transmission device 10A-1 and wireless transmission line WP2 that is connected to wireless transmission device 10A-2 belong to the same link group.

Figure 7:
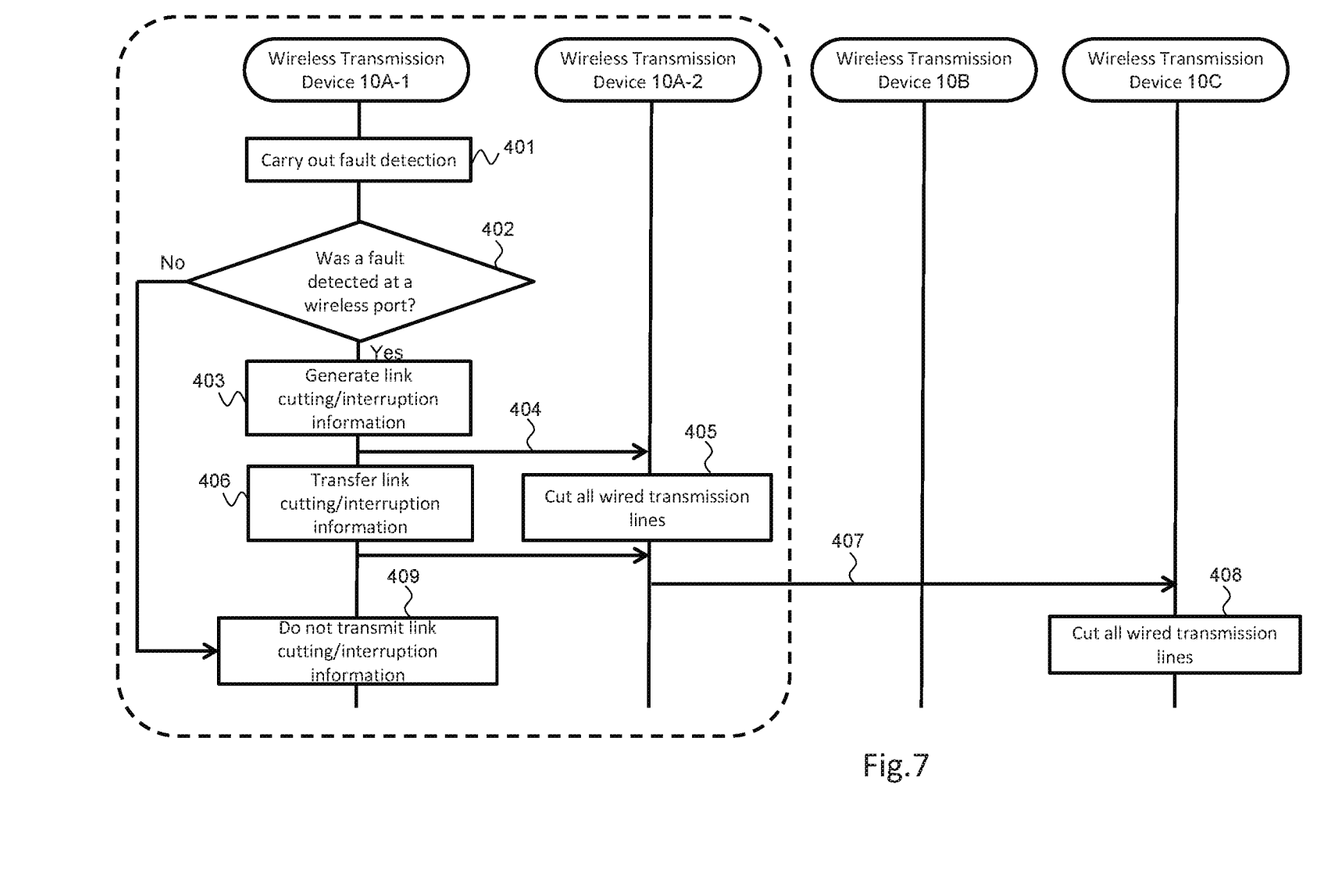
FIG. 7 is a sequence chart showing the operation procedure in the second example of the application of the present invention.

FIG. 6 is a view for describing the operation in the second application example of the present invention. FIG. 7 is a sequence diagram that shows the operation procedure in the second application example of the present invention.

As shown in FIG. 6, in the second application example, wired transmission line FPA3 and wireless transmission line WP1 belong to link group LG1A, and wireless transmission line WP1 and wireless transmission line WP2 belong to link group LG2A. Link group LG1B and link group LG1C are similar to the first application example. Link group LG2A is associated with link group LG1C.

In this state, a case is considered in which a fault occurs on, for example, wireless transmission line WP1.

In this case, upon detecting the fault that occurred on wireless transmission line WP1 (Step 401), and further, upon detecting a fault at a wireless port (Step 402), wireless transmission device 10A-1 generates link cutting information (Step 403) and transmits the link cutting information to wireless transmission device 10A-2 (Step 404). Wireless transmission device 10A-2, having received the link cutting information from wireless transmission device 10A-1, executes cutting of the communication connection of wired transmission line FPA3 (Step 405). Wireless transmission device 10A-1 instructs wireless transmission device 10A-2 to transfer the link cutting information (Step 406). When the transfer of the link cutting information is instructed from wireless transmission device 10A-1, wireless transmission device 10A-2 transfers the link cutting information to wireless transmission device 10C that is opposite to wireless transmission device 10A-2 (Step 407). Upon receiving the link cutting information from wireless transmission device 10A-2, wireless transmission device 10C executes cutting of the communication connections of wired transmission lines FPC1 and FPC2 that belong to link group LG1C that corresponds to link group LG2A (Step 408).

If wireless transmission device 10A-1 does not detect a fault at a wireless port in the determination of Step 402, wireless transmission device 10A-1 determines that the origin of the fault occurrence is elsewhere and does not transmit link cutting information (Step 409).

In the present invention, adjacent wireless transmission devices 10A-1 and 10A-2 together share their partners' own-device group information. As a result, regardless of the group information to which link group LG1A and LG2A belong, the information of link groups LG1A and LG2A is shared by adjacent wireless transmission devices 10A-1 and 10A-2. The flow of fault notification in FIG. 6 is shown schematically by broken-line arrows. As shown in FIG. 6, information of a fault that has occurred on wireless transmission line WP1 of wireless transmission device 10A-1 is reported to wireless transmission device 10A-2, and link cutting that originates in this fault is also executed at wireless transmission device 10C. In the sequence diagram shown in FIG. 7, Steps 406-408 are characteristic of the operation of this application example. Steps 404-405 are equivalent to link cutting control according to the technique disclosed in Patent Document 1 that was described in the background art.

Although it appears that the operation is duplicated in the sequence diagram shown in FIG. 7 (for example, Step 404 and Step 406), this representation is for the purpose of clarifying the difference from the technique disclosed in Patent Document 1.

Third Application Example

Figure 8:
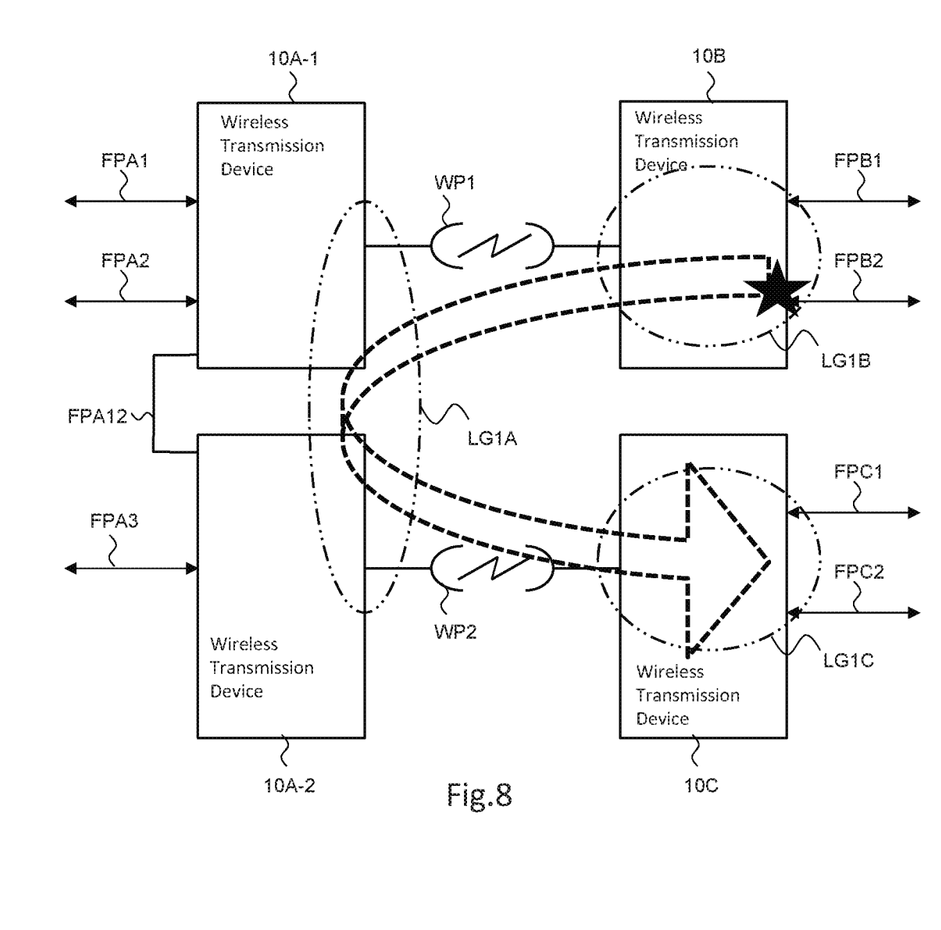
FIG. 8 is a view for describing the operation in a third example of application of the present invention.

The third application example is for a case in which wireless transmission line WP1 that is connected to wireless transmission device 10A-1 and wireless transmission line WP2 that is connected to wireless transmission device 10A-2 that is adjacent to wireless transmission device 10A-1 belong to the same link group.

Figure 9:
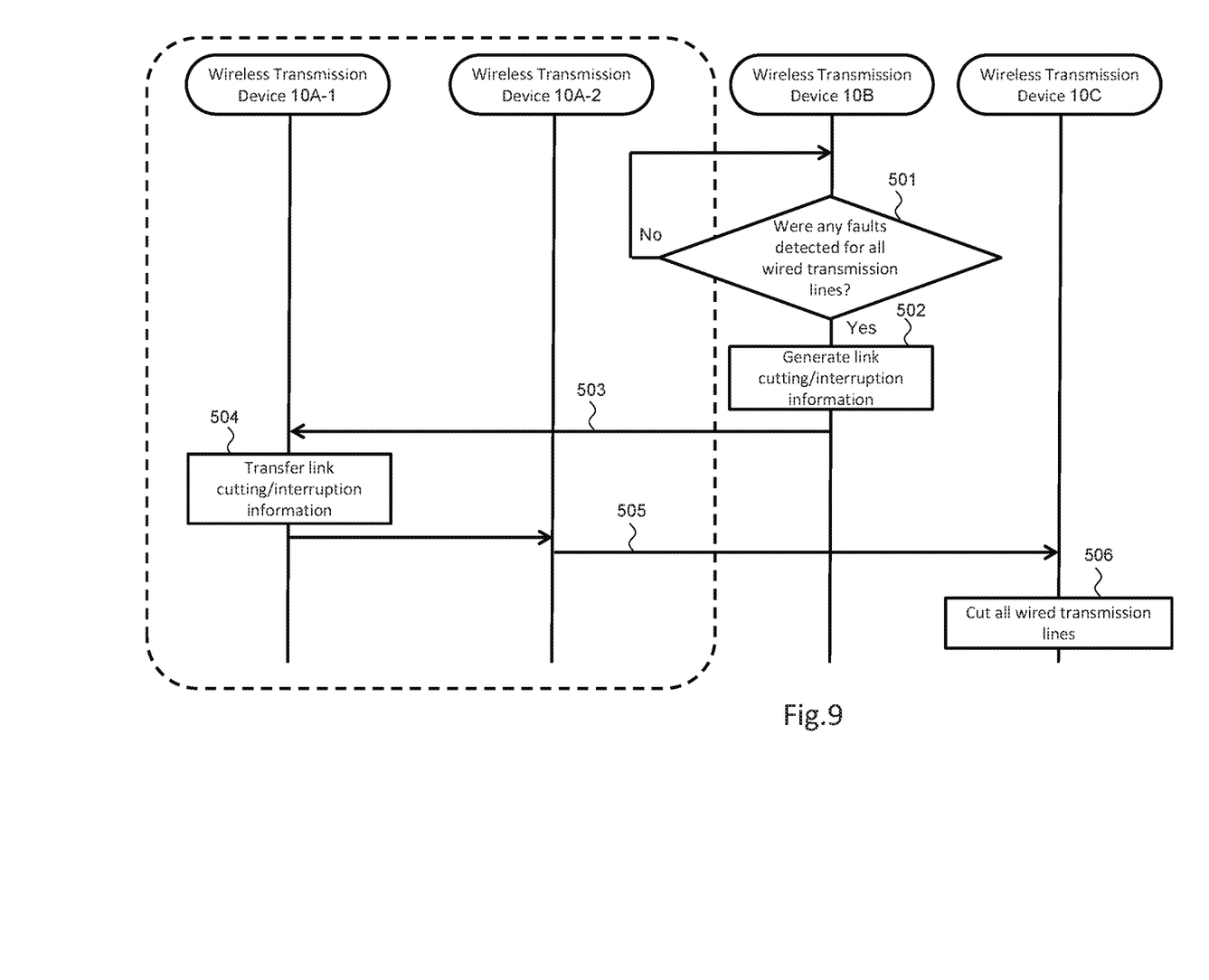
FIG. 9 is a sequence chart showing the operation procedure in the third example of the application of the present invention.

FIG. 8 is a view for describing the operation in the third application example of the present invention. FIG. 9 is a sequence diagram showing the operation procedure in the third application example of the present invention.

As shown in FIG. 8, in the third application example, wireless transmission line WP1 and wireless transmission line WP2 belong to link group LG1A. Link group LG1B and link group LG1C are similar to the first application example. Link group LG1A and link group LG1C are placed in association with each other.

In this state, a case is considered in which a fault occurs on, for example, wired transmission line FPB2 of wireless transmission device 10B.

In this case, upon detecting the fault that has occurred on wired transmission line FPB2 (Step 501), wireless transmission device 10B generates link cutting information (Step 502) and transmits the link cutting information to wireless transmission device 10A-1 (Step 503).

Upon receiving the link cutting information from wireless transmission device 10B, wireless transmission device 10A-1 transfers the link cutting information to wireless transmission device 10A-2 (Step 504). Wireless transmission device 10A-2, having received the link cutting information from wireless transmission device 10A-1, transmits the link cutting information to wireless transmission device 10C that is opposite to wireless transmission device 10A-2 by way of wireless transmission line WP2 (Step 505).

Wireless transmission device 10C, upon receiving the link cutting information from wireless transmission device 10A-2, executes the link cutting of wired transmission line FPC1 and wired transmission line FPC2 that belong to link group LG1C that corresponds to link group LG1A (Step 506).

In the present invention, adjacent wireless transmission devices 10A-1 and 10A-2 together share their partners' own-device group information. As a result, regardless of the group information to which link group LG1A belongs, the information of this link group LG1A is shared by adjacent wireless transmission devices 10A-1 and 10A-2. The flow of fault notification is schematically shown in FIG. 8 by the broken-line arrow. As shown in FIG. 8, the information of the fault that occurred on wired transmission line FPB2 of wireless transmission device 10B is reported to wireless transmission device 10C by way of wireless transmission device 10A-1 and wireless transmission device 10A-2, and link cutting that originates in this fault is also executed at wireless transmission device 10C.

According to the present invention, in a communication system that has a plurality of wireless transmission devices having one or more wired transmission lines or wireless transmission lines, adjacent wireless transmission devices share status information that contains information regarding the presence or absence of faults in the transmission lines in this link group where transmission lines that are connected to each of the adjacent wireless transmission devices are taken as one link group. As a result, when a fault occurs on any transmission line within a link group, fault information is reported from one of the devices that is connected to this transmission line to the other devices.

Further, because adjacent wireless transmission devices are treated as a single device by the information of a link group, even when a fault occurs on a transmission line that is not directly connected to another device (adjacent device), the information of this fault is reported to the adjacent device. As a result, an adjacent device is able to cause another device that is connected to itself (an opposite device) to execute link cutting control by transferring information of the fault to the opposite device.

Further, by placing in association a link group that is made up of adjacent devices with link groups that are made up of opposite devices, a fault that has occurred on a transmission line of a link group that corresponds to the link group of a particular device is reported to an opposite device of the particular device.

Although the invention of the present application has been described with reference to an example embodiment, the invention of the present application is not limited to the above-described example embodiment. The configuration and details of the invention of the present application are open to various modifications within the scope of the invention of the present application that will be clear to one of ordinary skill in the art.

The invention claimed is:

1. A wireless transmission device that groups as a first link group transmission lines that are connected to the wireless transmission device and transmission lines that are connected to adjacent devices that are wireless transmission devices that are adjacent to the wireless transmission device and that shares status information of transmission lines of the first link group with the adjacent devices, the wireless transmission device comprising:
   a control unit that holds said first link group in association with a second link group to which belongs a transmission line that is connected to an opposite device that is a wireless transmission device that is opposite the wireless transmission device or said adjacent devices by way of a wireless transmission line;
   wherein said control unit, when a fault occurs on a transmission line that belongs to said first link group, reports to an opposite device, which is connected to a transmission line that belongs to said second link group, link cutting information that contains information indicating a transmission line in which a link is cut by the fault.

2. The wireless transmission device according to claim 1, wherein said control unit has:
   an inter-device group information holding unit that holds information of said first link group and said second link group in association with each other;
   a link control unit that, upon receiving, from said opposite device, fault information that is information of a fault that has occurred on a transmission line that belongs to said second link group or said link cutting information of a transmission line that belongs to said second link group, cuts the connection of a transmission line that belongs to said first link group and that belongs to the wireless transmission device; and
   a link cutting information transmission unit that, when a fault has occurred on a transmission line that belongs to said first link group, transmits said fault information of the first link group to said opposite device, and when having received said fault information of said second link group from said opposite device, transfers the fault information to said adjacent devices.

3. A fault notification method realized by a wireless transmission device, comprising the steps of:
   grouping, as a first link group, transmission lines that are connected to the wireless transmission device and transmission lines that are connected to adjacent devices that are wireless transmission devices that are adjacent to the wireless transmission device;
   sharing status information of the transmission lines of said first link group with said adjacent devices;
   holding said first link group in association with a second link group to which belongs a transmission line that is connected to an opposite device that is a wireless transmission device that is opposite the wireless transmission device or said adjacent devices by way of a wireless transmission line; and
   when a fault occurs on a transmission line that belongs to said first link group, reporting to an opposite device, which is connected to a transmission line that belongs to said second link group, link cutting information that contains information indicating a transmission line in which a link is cut by the fault.

4. A non-transitory recording medium that can be read by a computer and on which is recorded a program for causing a computer to execute procedures of:
   grouping, as a first link group, transmission lines that are connected to the computer and transmission lines that are connected to adjacent devices that are wireless transmission devices that are adjacent to the computer;
   sharing status information of the transmission lines of said first link group with said adjacent devices;
   holding said first link group in association with a second link group to which belongs a transmission line that is connected to an opposite device that is a wireless transmission device that is opposite the wireless transmission device or said adjacent devices by way of a wireless transmission line; and when a fault occurs on a transmission line that belongs to said first link group, reporting to an opposite device, which is connected to a transmission line that belongs to said second link group, link cutting information that contains information indicating a transmission line in which a link is cut by the fault.

\* \* \* \* \*